July 4, 1967
O. F. VAN BROCKLIN
3,329,180
INFLATOR MEANS FOR TIRES AND THE LIKE
Filed Nov. 15, 1963
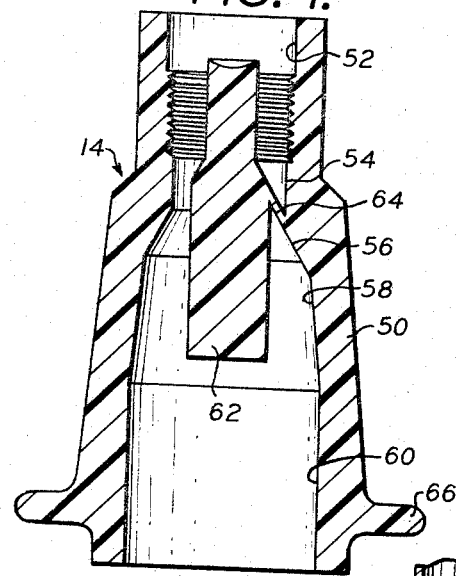
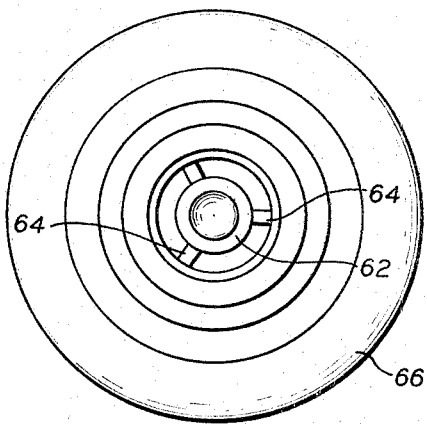
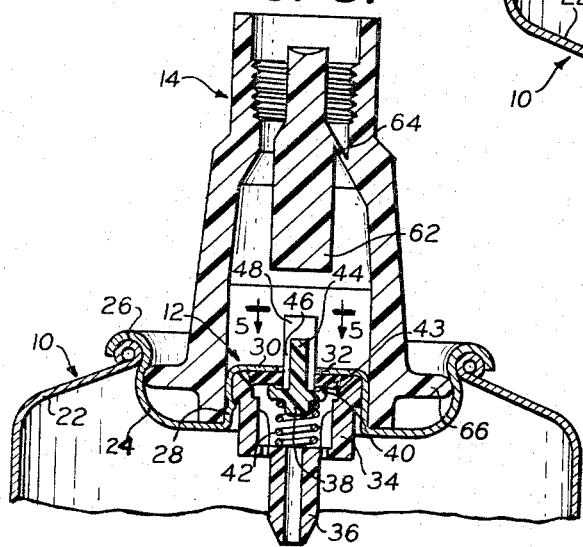
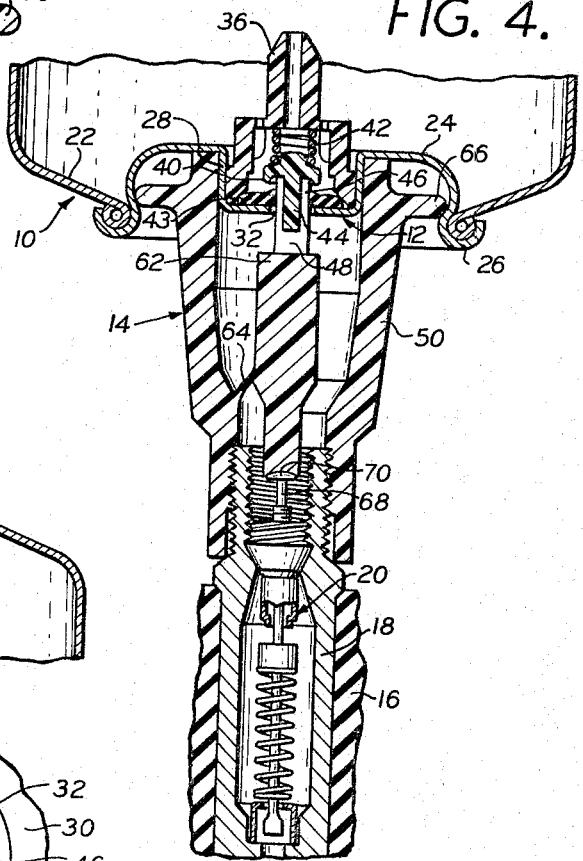
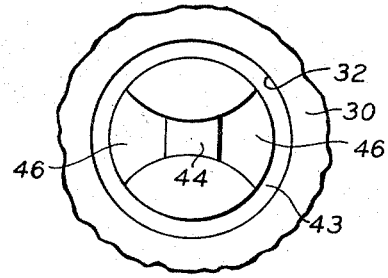
INVENTOR
OWEN F. VAN BROCKLIN
BY
Byerly Townsend, Watson & Churchill
ATTORNEYS.

3,329,180
INFLATOR MEANS FOR TIRES AND THE LIKE
Owen F. Van Brocklin, Baldwin, N.Y., assignor to Scovill Manufacturing Company, Waterbury, Conn., a corporation of Connecticut
Filed Nov. 15, 1963, Ser. No. 323,952
4 Claims. (Cl. 141—349)

The present invention relates to inflator means for use as an emergency means for inflating a pneumatic tire although it may be used for inflating a life raft or other inflatable object.

Modern automobile travel has as a concomitant thereof the possibility of a tire becoming punctured or going "flat" for other reasons at a location far distant from a service station. When such a contingency occurs, considerable time is required to remove and replace a deflated tire or make a repair thereto and on a much travelled roadway causes congestion of traffic and danger to the motorist. Because of such hazards, it has been heretofore proposed to provide an inflator means consisting of a relatively small light-weight container filled with a gas under pressure or with a liquefied gas or both, equipped with an adapter having a fixed deflator pin, the relationship of parts being such that upon pushing the adapter onto the valve nipple of a pneumatic tire, the deflator pin will engage and unseat the tire valve and by virture of the deformability of a coupling flange on the adapter it will be moved axially to unseat the container valve whereupon the compressed or liquefied gas will flow into the tire to inflate it. This prior type of inflator means requires substantial alinement of the tire valve and the container valve and also the holding manually of the device onto the tire valve until inflation of the tire is completed. Certain types of such emergency inflators use as the container contents a composition, usually a fluorinated hydrocarbon, having dissolved therein or admixed therewith a latex composition with or without fibers, which composition when injected into a punctured tire will seal the puncture while inflating the tire. These prior types of inflators, however, possess certain inherent objection such as: (1) certain of them consist of two or more parts which require an assembling operation; (2) they require initial alinement of the tire valve with the valve of the gas container and considerable force in applying and holding them onto the tire valve; (3) the flow areas of the passages through the adapter and/or the valve on the container are too small to provide an unobstructed latex and fiber flow therethrough and soon the device became clogged and gave rise to defective operation in use.

Accordingly, the present invention has among its objects:

(a) to provide a simple inflator means which will obviate the deficiencies inherent in prior devices;

(b) to provide a simple inexpensive adapter which will facilitate the coupling to a tire valve, of a container of inflating fluid under sufficient safe pressure to produce, when released, sufficient gas volume and pressure to reinflate a partially flat tire;

(c) to form the container valve and the adapter with sufficient flow area to provide a non-clogging path for gas and sealant, and (d) to provide an adapter which can be force fitted or readily snapped onto a container of inflating fluid and provide therewith an hermetic seal and an interference fit which will insure rotation of the adapter by the container and facilitate coupling and uncoupling of the inflator means with a valve of a tire or other inflatable body.

The foregoing and other objects of the invention, not specifically enumerated, I accomplish by providing an inflator means or unit consisting of a container for a fluid at super-atmospheric pressure and provided with a valve having a substantial area of egress when open for the gas and sealant and a one-piece adapter, preferably formed of a molded deformable resilient plastic and so shaped to frictionally grip and interfit with the valved top of the container to insure unitary movement of the adapter with the container, said adapter being preferably formed integrally with a floating internal pin, such that as the adapter is threaded onto a tire valve stem, the floating pin will first engage and open the tire valve within such valve stem or valve core and then as the threading engagement progresses will unseat the closure valve of the compressed fluid container to permit the contents thereof to discharge into the tire. As the unit is removed from the tire valve, the container valve will close before the tire valve closes. The invention will be better understood from the detailed description which follows when considered in connection with the accompanying drawing which shows a preferred embodiment, and wherein:

FIG. 1 is an axial sectional view through an adapter forming part of the present invention;

FIG. 2 is a top plan view of the adapter shown in FIG. 1;

FIG. 3 is an axial sectional view of the inflator means and the valved closed end of a container for fluid under super-atmospheric pressure;

FIG. 4 is an axial sectional view corresponding to FIG. 3, in inverted relation, in operative position to inflate a tire;

FIG. 5 is a top plan view, on an enlarged scale, of the valved closure of the container, as viewed in the direction of the arrows along the line 5—5 of FIG. 3.

Referring to the drawing, the inflator means may be said to consist of a container 10 having a valved closure 12, an adapter 14 for attachment to the container and to an article 16 to be inflated such as a pneumatic tire provided with a tire valve stem 18 having a check valve 20 therein.

The container 10 may be of any desired construction and as shown is an open top can 22 which is closed by the valved closure 12 and adapted for holding a fluid at superatmospheric pressure.

The valved closure 12 is a cup shaped cap member 24, the outer periphery of which is beaded over the open top of the can by a rolled joint 26 and the inner periphery of which is formed as a re-entrant pedestal 28 formed with an inwardly directed flange 30 having a central opening 32. The cap member 24 supports a valve and spring cup 34 formed with a depending nipple 36. Within the cup 34 is mounted a valve member 38 having a peripheral flange 40, the valve being biased by a spring 42 to normally hold the flange 40 in engagement with the underside of a sealing washer 43 and also normally hold said washer in sealing engagement with the underside of the flange 30. The valve 38 is also formed with a substantially cylindrical stem 44 which is snugly slidable through the opening in the sealing washer and loosely through the opening 32 in the flange 30. The stem 44 is formed with opposite longitudinal grooves 46 which communicate with each other through a slot 48 in the top of said stem.

The adapter 14 consists of a tubular body member 50, which is preferably formed of molded, relatively rigid, resiliently deformable material such as low density polyethylene, having a bore with portions 52, 54, 56, 58 and 60 of increasing diameter from its outer end to its inner end, the bore portion 52 being unthreaded, the bore portion 54 being threaded at its outer end, the bore portion 56 being tapered and connecting the bore portions 54 and 58 and the bore portion 60 being of largest diameter; a pin 62 of smaller diameter than the bore is floatingly mounted within the bore and integrally connected to the body member by a spider having flexible webs 64 to provide for free flow of fluid through the adapter. The floating pin 62 is of a length such that its opposite ends are spaced inwardly from the respective ends of the tubular body member and the pin is biased outwardly by the flexible webs 64 toward the outer end of the adapter. Adjacent its inner end, the tubular body member 50 is formed with an external flange 66. The diameter of the bore portion 60 is slightly smaller than the external diameter of the pedestal 28 and the diameter of the flange 66 is slightly larger than the internal diameter of the cup shaped cap member 24 so that the adapter can be force fitted onto the cap member to provide both a fluid-tight seal and an interference fit therewith, whereby the adapter will be held by and movable with the container as a unit.

The article 16 to be inflated may be any inflatable object and preferably is a pneumatic tire provided with a conventional tire valve stem 18 within which is mounted a conventional check valve or valve core 20. The tire check valve 20 is formed with a valve pin 68 having an enlarged head 70 as is conventional in most tire valve cores.

The adapter 14 may be made and sold to packagers or fillers of fluid containers with a suitable gas under pressure or low boiling point liquid, or to distributors of such filled containers for attachment thereto. Such attachment merely requires force fitting the adapter onto the cup shaped valved closure 12 of the container. The assembly, constitutes the inflator means.

In use, to inflate a deflated or punctured tire, the inflator means consisting of the container with the adapter attached thereto, is screwed onto the tire valve. To facilitate this, the unthreaded bore portion 52 of the adapter is positioned over the threaded nipple of the valve stem and given about three turns which will be sufficient to make a fluid-tight seal at the threads. The inner diameter of the tire valve stem nipple centralizes the floating pin 60 so that the valve core pin 68 and the container valve stem 44 are all in alinement. As the container is further rotated, the tire valve core pin 68 is first depressed to open the tire valve 20 and as rotation of the container is continued the tire valve becomes fully depressed and serves as an abutment to cause the operating pin 62 to move against the biasing force of the flexible webs 64 to unseat the container check valve 38. As the container valve stem 44 moves into the valve and spring cup 34, the slotted valve stem moves below the sealing washer 42 and discharge of the container contents takes place through the grooves 46 and slot 48 in the valve stem, into and through the bores of the adapter and the open tire valve into the tire to inflate it. After inflation is accomplished, unscrewing the inflator means from the tire valve stem will permit the container valve 40 to seat first closing off further flow of the container contents, after which the tire valve will seat. The contents of the container upon release and expansion into the tire will be of sufficient volume to inflate most standard sizes of automobile tires to a satisfactory operating pressure. Where the inflator means are used to reinflate bicycle tires and the like, the device may be repeatedly used for numerous inflations.

Where the contents of the container include a latex composition admixed with fibers, the grooves 46 in the container valve stem will insure a sufficiently large flow area to provide a non-clogging path for the gas, sealant and fibers.

Although I have shown and described a preferred embodiment of the invention, it is to be understood that changes in the details of construction and assembly of parts may be resorted to within the range of engineering skill without departing from the spirit of the invention as hereinafter claimed.

What I claim is:

1. An inflator means comprising a container for holding a fluid at super-atmospheric pressure, a cap on said container having a hollow cup with a re-entrant pedestal therein in which latter is mounted a closure check valve, an adapter for transferring fluid under pressure from said container to an inflatable article, said adapter having a tubular body member formed of relatively rigid deformable material, one end of said tubular member having an inner diameter adapted to engage over and provide with the pedestal a fluid tight seal and the tubular member adjacent said end also has an external radially extending flange of such a diameter as to be force fitted within the circumferential wall of the cup, and to form therewith a fluid tight seal, said adapter when applied to the cap forming therewith an assembly having an interference fit, and a floating pin within said tubular body for unseating the check valve in the pedestal whereby the fluid is forced around said pin and through said tubular body and into said inflatable article.

2. An inflator means according to claim 1 wherein the other end of the tubular body member is screw threaded for attachment to the threaded end of a valved stem of an inflatable article and wherein the floating pin within the tubular body member is connected thereto integrally by a flexible spider which normally biases the end of said pin, which is in proximity to the end of the tubular body member held on the container, out of engagement with the closure valve in the container, said floating pin being movable in opposition to the biasing action on the spider, in the course of screw threading the adapter onto the valve stem of the inflatable article to first engage and unseat a check valve in such valve stem and thereafter as the threading-on action of the adapter onto said valve stem is continued, to open the check valve of the container to provide for fluid communication between the interior of the container and the interior of the inflatable article.

3. An adapter for use in transferring fluid under super-atmospheric pressure from a container having a cup-shaped closure cap formed with a re-entrant pedestal which supports a closure check valve, to an inflatable article, said adapter comprising a tubular body member formed of relatively rigid deformable material, one end of said tubular body member having an inner diameter adapted to engage over and form with the pedestal a fluid tight seal and the tubular body member adjacent said end also having an external radially extending flange of such a diameter as to be force fitted within the circumferential wall of such cup, and to form a fluid tight seal therewith, said adapter when applied to the cup providing therewith and interference fit, whereby the container and the adapter can form an assembled unit and a floating pin within said tubular body member for unseating the closure check valve in the pedestal whereby the fluid is forced around said pin and through said tubular body and into said inflatable article.

4. An adapter according to claim 3, wherein the opposite end of the tubular body is screw threaded for engagement with screw threads on a check valve containing stem of an inflatable article and wherein the floating pin within the tubular body member is connected thereto integrally by a flexible spider which normally biases the end of said pin toward said threaded end of the tubular body, whereby as the adapter is threaded onto said valve stem of the inflatable article, the end of the floating pin adjacent said threaded end of the tubular body will first engage and unseat the check valve in such valve stem and as the threading-on action is continued the opposite end of the floating pin will be moved in opposition to the biasing action of the spider to engage and open the closure check valve of the container to establish fluid communication between the interior of the container and the interior of the inflatable article.

References Cited

UNITED STATES PATENTS

| | | | |
|---|---|---|---|
| 2,812,783 | 11/1957 | Bufogle | 141—38 |
| 2,953,985 | 9/1960 | Begell | 141—340 X |
| 3,035,617 | 5/1962 | Breitenstein | 251—149.7 X |
| 3,131,733 | 5/1964 | Monahon | 141—20 X |
| 3,144,057 | 8/1964 | O'Donnell | 141—354 |
| 3,158,179 | 11/1964 | Lehmann | 222—394 M |
| 3,245,423 | 4/1966 | Hansen et al. | 251—149.6 X |

FOREIGN PATENTS

| | | |
|---|---|---|
| 245,291 | 6/1963 | Australia. |
| 1,201,761 | 7/1959 | France. |

LAVERNE D. GEIGER, *Primary Examiner.*

E. J. EARLS, *Assistant Examiner.*